(12) United States Patent
Kim et al.

(10) Patent No.: US 6,846,445 B2
(45) Date of Patent: Jan. 25, 2005

(54) METHOD FOR RAPID MOLD HEATING AND COOLING

(76) Inventors: Byung Kim, 23 Woodlot Rd., Amherst, MA (US) 01002; Donggang Yao, 522 Timberlea Dr., Rochester Hills, MI (US) 48309

( * ) Notice: Subject to any disclaimer, the term of this patent is extended or adjusted under 35 U.S.C. 154(b) by 0 days.

(21) Appl. No.: 10/234,507

(22) Filed: Sep. 4, 2002

(65) Prior Publication Data
US 2004/0041303 A1 Mar. 4, 2004

(51) Int. Cl.⁷ ............................................ B29C 45/73
(52) U.S. Cl. .................. 264/404; 264/402; 264/328.16
(58) Field of Search ......................... 264/404, 328.16, 264/402

(56) References Cited

U.S. PATENT DOCUMENTS

| | | | |
|---|---|---|---|
| 2,979,773 A | | 4/1961 | Bolstad et al. |
| 2,984,887 A | | 5/1961 | Thiess et al. |
| 3,671,168 A | | 6/1972 | Nussbaum |
| 3,763,293 A | | 10/1973 | Nussbaum |
| 3,950,463 A | * | 4/1976 | Jones ........................ 264/632 |
| 4,060,364 A | | 11/1977 | Gras |
| 4,201,742 A | | 5/1980 | Hendry |
| 4,340,551 A | | 7/1982 | Wada et al. |
| 4,390,485 A | | 6/1983 | Yang |
| 4,442,061 A | | 4/1984 | Matsuda et al. |
| 4,496,131 A | * | 1/1985 | Yang ........................... 249/78 |
| 4,548,773 A | | 10/1985 | Suh et al. |
| 4,576,671 A | * | 3/1986 | Shimanaka ................. 156/245 |
| 4,657,625 A | * | 4/1987 | Kawakami ................. 156/471 |
| 4,800,049 A | | 1/1989 | Gras |
| 5,007,818 A | * | 4/1991 | Barancik et al. ............ 425/144 |
| 5,041,247 A | | 8/1991 | Kim |
| 5,176,839 A | | 1/1993 | Kim |
| 5,232,653 A | | 8/1993 | Addeo et al. |
| 5,294,382 A | * | 3/1994 | Goldberger ................. 264/450 |
| 5,489,410 A | | 2/1996 | Baumgartner et al. |
| 5,535,980 A | | 7/1996 | Baumgartner et al. |
| 5,728,474 A | | 3/1998 | Niemeyer et al. |
| 5,762,972 A | | 6/1998 | Byon |
| 5,942,259 A | * | 8/1999 | Uchiyama et al. ..... 425/174.8 R |
| 5,965,080 A | * | 10/1999 | Ando et al. ................. 264/404 |
| 6,009,925 A | * | 1/2000 | Hall et al. .................... 156/358 |
| 6,063,321 A | * | 5/2000 | Koyama et al. ............ 264/404 |
| 6,309,579 B1 | * | 10/2001 | Koyama et al. ............ 264/278 |
| 2003/0141609 A1 | * | 7/2003 | Jia ................................ 264/39 |

OTHER PUBLICATIONS

Holman, J.P. Experimental Methods for Engineers. New York: McGraw–Hill, Inc. 1994. Pages 125 and 126.*

* cited by examiner

*Primary Examiner*—Michael P. Colaianni
*Assistant Examiner*—Monica A. Fontaine

(57) ABSTRACT

A method for rapidly heating a mold cavity to a predetermined temperature preferably above the softening or melting temperature of the molding material prior to and during the molding stage thereby increasing moldability and improving quality of molded parts. The mold cavity is formed by two metallic halves on which high-frequency electric current is applied and an electric circuit involving the two halves is formed. Due to the proximity effect, the electrical current flows on the inner surfaces of the two cavity halves, thus rapidly heating the mold cavity. Proper use of insulation behind the cavity surface helps increase heating efficiency. Conformal on-off cooling channels provide both thermal insulation during the heating phase and rapidly cooling of the molded article during the cooling phase.

19 Claims, 8 Drawing Sheets

(c) A pair of metal blocks or bars passing high frenquency electric current with magnetic core attached on the back of each block or bar (a) A metal block or bar passing high-frenquency electric current (b) A pair of metal blocks or bars passing high frenquency electric current (c) A pair of metal blocks or bars passing high frenquency electric current with magnetic core attached on the back of each block or bar (a)

(b)

(c)

(a)

(b)

(c)

a) Conventional molding b) Molding using the invention

METHOD FOR RAPID MOLD HEATING AND COOLING

STATEMENT REGARDING FEDERALLY SPONSORED RESEARCH OR DEVELOPMENT

Research leading to the invention disclosed and claimed herein was supported in part by the National Science Foundation, NSF Grant No. DMI-9713519. The U.S. Government may have certain rights to the invention.

CROSS-REFERENCE TO RELATED APPLICATIONS

Not applicable.

BACKGROUND

1. Field of Invention

The field of the invention pertains to molding of thermoplastic materials, in particular, to the provision of improved part quality and replication for molded articles. The method and disclosed in this patent is applicable to common molding processes, i.e., injection molding, compression molding, blow molding, and thermoforming, wherein either a molten or malleable plastic material is placed inside the mold cavity or between two mold halves, shaped under pressure and then solidifies through cooling.

2. Description of Prior Art

Thermoplastic molding processes involve large and permanent deformation of the material at elevated temperature. It is common for conventional molding processes that the mold temperature stays at a preset constant temperature which is below the softening temperature of the material. Auxiliary heating and chilling equipment is usually employed to maintain this constant mold temperature. The so-configured manufacturing processes are robust and economically attractive due to very short cycle time, typically from several seconds to a minute, in producing common thermoplastic articles. However, these conventional molding processes also suffer from problems caused by great temperature difference between the material and the mold. Particularly in injection molding, the frozen layer resulting from such temperature difference is one of the primary causes for orientations, residual stresses, difficulty in molding thin sections, poor surface quality, and weak weld lines. In order to alleviate the premature freezing problem, a mold temperature close to or above the material softening temperature is need, thus resulting in intolerably long cycle time. For example, the cycle time for molding an aircraft shielding window using polycarbonate can be as long as several hours. The ideal molding condition would thus be a hot mold during the molding stage and a cold mold during the cooling stage. This ideal molding condition essentially uncouples the cooling process from the molding process and eliminates the processing contradiction.

To approach the hypothetical optimum molding condition, molding systems with very rapid heating and cooling capability on the time scale of the conventional cycle time are required. Since repeatedly heating and cooling a relatively massive mold requires considerable time and energy, means of heating only the mold surface are desired. This approach has been exemplified in the prior art as disclosed in U.S. patents.

U.S. Pat. No. 2,979,773 discloses a method and apparatus for heating the cavity surface wherein a semiconductive film is coated on the mold surface and an aluminum electrode plated into the semiconductive film.

U.S. Pat. No. 2,984,887 discloses a molding apparatus with an electrically heated copper or silver coating on the mold surface.

U.S. Pat. Nos. 3,671,168 and 3,763,293 disclose an approach to convectively heat the mold cavity using hot fluids.

U.S. Pat. No. 4,060,364 discloses an apparatus to produce molded plastic articles with a turntable carrying a plurality of molds through different stations. High-frequency dielectric heating is used to rapidly heat the plastic material.

U.S. Pat. No. 4,201,742 discloses a method for heating the mold cavity surface by means of condensing steam and draining the condensate from the cavity just prior to the injection stage.

U.S. Pat. No. 4,340,551 discloses a method to selectively heat only the superficial layer of the inner wall surface of the mold by high-frequency induction heating, to a temperature above the heat distortion temperature of the thermoplastics resin prior to injection molding.

U.S. Pat. No. 4,390,485 discloses a mold design that facilitates rapid heating and cooling by employing one or more thin metal surface sheets or bands of high electrical resistivity in the mold cavity heated using electrical current.

U.S. Pat. No. 4,442,061 discloses a heat cycle injection compression molding method wherein a temperature control apparatus with water and hot steam is used to reheat the injected plastic inside the mold cavity.

U.S. Pat. No. 4,548,773 discloses a mold design which features a cavity surface heated with electrical resistance heaters and controllably cooled by means of variable conductance heat pipe.

U.S. Pat. No. 4,800,049 describes a method and apparatus for manufacturing molded objects out of plastic material from a liquid plastisol which is injected into a mold subjected to high frequency dielectric heating.

U.S. Pat. Nos. 5,041,247, 5,176,839, 5,489,410, 5,535,980, and 5,728,474 that all assigned to General Electric Company disclose a multilayer mold that is passively heated by the incoming molten plastics.

U.S. Pat. No. 5,232,653 discloses a low thermal inertia mold with an embedded electrical resistivity heating unit and an embedded cooling system just beneath the mold surface.

U.S. Pat. No. 5,762,972 discloses an apparatus performing induction heating or dielectric heating of a mold for an injection molding system up to a desired temperature within a short time by using high frequencies or microwaves.

The use of systems like those disclosed in the prior art would presumably provide heat to a mold directly at the mold surface. One drawback of these methods, however, is their relatively low heating and cooling performance, i.e. low heated temperature, or slow thermal response. For example, one of the most popular methods, the passive heating method, which has been continuously improved over the past fifteen years and protected by many patents typically raises a temperature jump lower than 50° C. Active heating methods using direct current, alternating current, high frequency induced current, or microwave signals, such as those disclosed in U.S. Pat. Nos. 2,979,773, 2,984,887, 4,340,551, 4,390,485, and 5,762,972, theoretically could rapidly raise the mold surface temperature to over the polymer melting temperature. However, the reported heating rates are slow. For example only about 80° C./min was reported for an induction heated mold in U.S. Pat. No. 4,340,551. The reason for such low heating performance could be partially attributed to their relatively low thermal and mechanical durability and low heating efficiency.

The present invention discloses a new method for rapid mold heating based on surface heating generated by surface current due to proximity effect and/or skin effect on the mold insert powered by radio-frequency or high-frequency electrical current. When high frequency electrical current passing through a bulk or thick pair of electrical conductors which face with each other with a small gap in-between, the current will flow on the inner sides of the facing pair. This effect is referred to as the proximity effect in the application. When high frequency electrical current passing through a bulk or thick electrical conductor, the current will flow on the surface of the conduct. This effect is referred to as the skin effect in the application. The principle of the skin effect and the proximity effect is illustrated in FIG. 1.a and FIG. 1.b, respectively, and described and explained in detail in the DESCRIPTION OF THE INVENTION section.

SUMMARY OF THE INVENTION

The present invention comprises a method and to rapidly heat and cool a mold surface or portions. The principle of the new rapid mold heating method is based on surface heating generated by surface current due to proximity effect and/or skin effect on the mold insert powered by radio-frequency or high-frequency electrical current. In the present invention, mold pieces or portions of the mold to be heated directly participate in the high-frequency electrical circuit. This new mold heating method is an active heating method and allows heating even when the mold is closed and thus heating is controllable during the entire molding stage. A simple embodiment of the invention involves two metallic mold pieces facing each other with an in-between gap of about a fraction of one millimeter to tens of millimeters. Radio-frequency or high-frequency electrical current is connected to one mold piece and then to the second piece that faces the first piece. The proximate effect drives the majority of the electrical current to flow in the inner surface of the two mold pieces, thus heating the inner surfaces. To improve heating efficiency, the generated energy is transiently insulted from the bulk mold base material by utilizing insulation beneath the mold surface. This insulation could be a second material such as ceramics, could be an air gap/pocket, or could be just gradient material property in the direction perpendicular to the cavity surface. The insulation is designed in such a way that it provides sufficient thermal barrier during heating while it still permits rapid heat transfer during mold cooling. By controlling the heating power, the desired heating temperature can be achieved within a few seconds or less. Heating using this method is active and controllable and its applications are not limited to heating the mold surface only prior to the molding stage. Heating can still be active during the molding stage to maintain the heated temperature or in-situ control the mold surface temperature. This is very useful in injection molding when a long filling time has to be used due to a long filling path relative to it lateral dimension. This is also very useful when the mold surface temperature needs to be controlled to optimize the thermo-mechanical history of molded articles. Because only the mold surface is heated, the heated mold can subsequently cooled rapidly by flowing coolant beneath the mold surface. The examples in the present disclosure focus on applications in injection molding, but the method and is applicable to other molding processes, such as compression molding, thermoforming, blow molding, etc.

OBJECTS AND ADVANTAGES

Accordingly, several objectives of this invention are:

An objective of this invention is to provide a new method of rapidly heating and cooling the mold surface. The new method utilizes surface heating generated by surface current due to proximity effect and skin effect on a metallic mold or its member where radio-frequency or high-frequency electrical current is powered.

Another objective of this invention is to shorten the molding cycle time when elevated mold temperatures are need for improved part quality by providing a durable molding system capable of quickly raising the mold surface temperature to above the polymer softening temperature and rapidly cooling to the demolding temperature. This cycling of the mold temperature can significantly reduce the total cycle time compared to the molding at a constant mold temperature.

A further objective of this invention to provide a molding method and that will greatly improve quality of molded parts, such as better feature replication, less birefringence, less residual stress, stronger weld lines, better surface quality, increased crystallinity, etc.

Further objects and advantages of this invention will become apparent from a consideration of the drawings an ensuing description.

DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DESCRIPTION OF THE INVENTION

Figure 1:
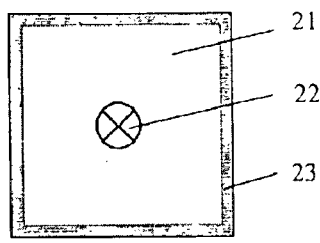
FIG. 1 illustrates the principle of the invention, i.e., skin effect and proximity effect in a radio-frequency or high-frequency electric circuit.
Figure 1:
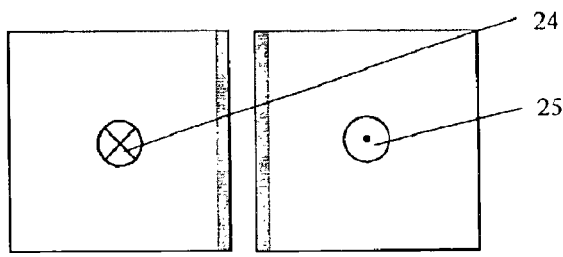
Figure 1:
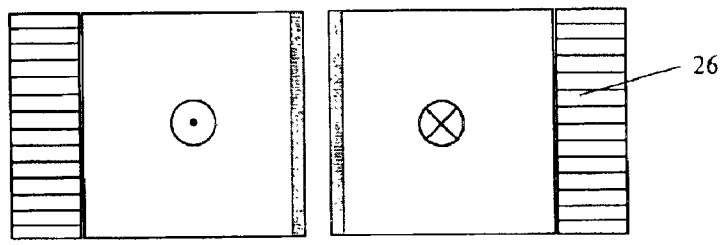

FIG. 1 illustrates the principle of the invention.

FIG. 1.a shows a cross section of a metal block or bar 21 passing high-frequency or radio-frequency electric current 22. Due to the skin effect, the current will flow on the surface or skin of the metal block 21 and form a layer of skin current 23. For any geometry of cross section, the current will flow at the skin. The thickness of the skin layer, defined as the layer in which 95% of the current passes through, can be approximated using the following equation:

$$\text{Skin thickness} \approx \sqrt{\frac{\sigma}{\pi f \mu_r \mu_0}},$$

where $\sigma$ is resistivity; f is the frequency of the current; $\mu_0=1.257\times10^{-6}$H/m is free space permeability; and $\mu_r$ is relative permeability. For example, the skin thickness will be about 25 $\mu$m (or about 0.001 inch) when a 1000 KHz electrical current pasing through a steel material with $\sigma=5\times10^7\Omega$-m and $\mu_r=200$. Therefore, the electric heating generation will be confined in a very thin skin layer. The skin effect occurs for all metallic materials under any frequency range, but a magnetic material such as steel and substantially high frequency electric current are prefered to achieve good skin effect.

FIG. 1.b shows cross section of two metal blocks or bars passing high-frequency or radio frequency electric current 24 and 25 in opposite directions. For a system lik this, the current tends to flow on the two inner sides of the two metal blocks or bars, thus resulting in the so-called proximity effect. A modification of FIG. 1.b is shown in FIG. 1.c, where high-permeability magnetic materials 26 are placed on the back of the two metal blocks or bars. The two high-permeability pieces strengthen the proximity effect so that the current gets more confined at the gap.

The skin effect and the proximity effect are two of the main concerns in power delivering systems for high-frequency electric current. A thin skin layer has much higher resistance than does a solid bar or block, thus generating much more electric heating. Engineers dealing with high-frequency electric powers, therefore, often try their best to get rid of such skin and proximity effects.

Figure 2:
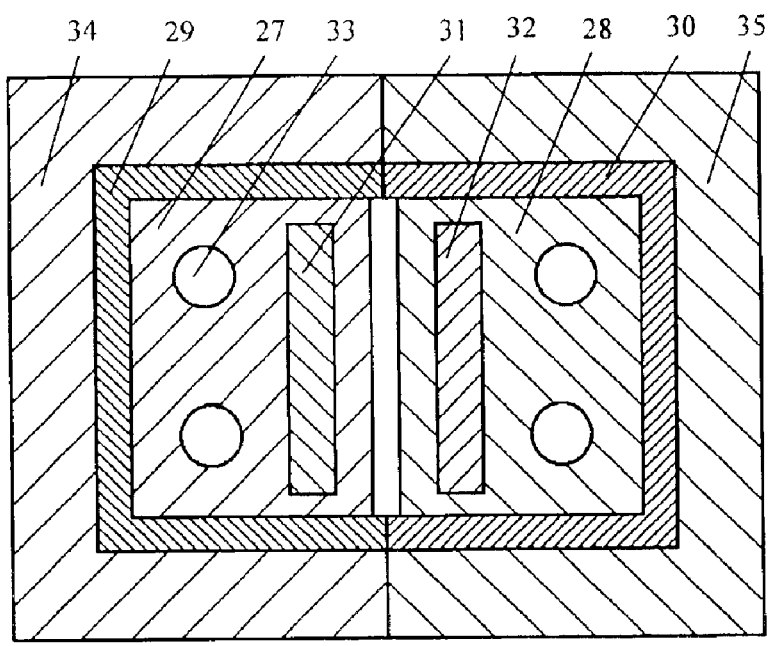
FIG. 2 schematically illustrates the cross section of a mold cavity designed for proximity heating.

The present invention makes use of the skin and proximity effects to generate heat on the cavity surface of the mold. FIG. 2 schematically illustrates a cross section of a mold cavity designed for proximity heating. A pair of metallic mold inserts 27 and 28 face each other and form a radio-frequency or high-frequency electric circuit. The material for each insert can be any of commonly used metals, with preferred choices among ferrous or magnetic metals. Each insert can comprise more than one metallic material, joined together by common mechanical joining processes, or accumulating on each other by surface technology such as deposition, coating, plating, etc. The two inserts can be situated in one mold base or separate mold bases. When in one mold base, a fixed gap exists between the two inserts. When in separate mold pieces, the two inserts come together and form a gap when mold closes. The size of the gap between the mold inserts 27 and 28 is in the range of a fraction of a millimeter to tens of millimeters. The surface contour of the so-formed cavity is not limited to straight shapes, and can be general contours as long as a gap is formed between the mating inserts. Part features and microstructures can be manufactured on the cavity surface. Two insulation pieces 29 and 30 provide electric insulation between the two metallic inserts and between the two inserts and the mold bases 34 and 35. The materials for 29 and 30 can be commonly used high-strength and stiff insulation materials with low magnetic permeability such as ceramics, composites, glass, etc., can be an insulation coating on the mold insert, can be an oxidation or nitride layer on the metal surface, etc. The purpose of using low-magnetic-permeability (i.e. magnetically transparent) materials for 29 and 30 is to allow the magnetic flux to pass through 29 and 30 and form a magnetic flux loop. Due to proximate effect, the current will flow on the surface of the cavity and generate electric heating on the cavity surface. Insulations 31 and 32 are used to increase heating efficiency and avoid significant heating energy to sink into the mold base. The design of the insulation function from 31 and 32 should be optimized, because too much insulation will result in a prolonged cycle time. 31 and 32 can be common high-strength and stiff insulation materials such as ceramics, can be air gaps/pockets, or can be gradient materials that have gradient thermal properties in the direction perpendicular to the cavity surface. Cooling channels 33 are built in the mold insert or in the mold base and can have conformal configuration.

There are many modifications possible in the above design. For example, one modification is to use only one metallic mold insert or to have only one metallic insert participate in the radio-frequency or high-frequency circuit. In this case, the principle in FIG. 1.a is followed and the skin effect will result in heating on the outside surface of the insert. This is useful when either a cavity or a core needs to be heated. Any modification which directly uses a metallic component of a mold to participate in a radio-frequency or high-frequency circuit is considered to be a variation of the design in FIG. 2 and is claimed by this invention.

Figure 3:
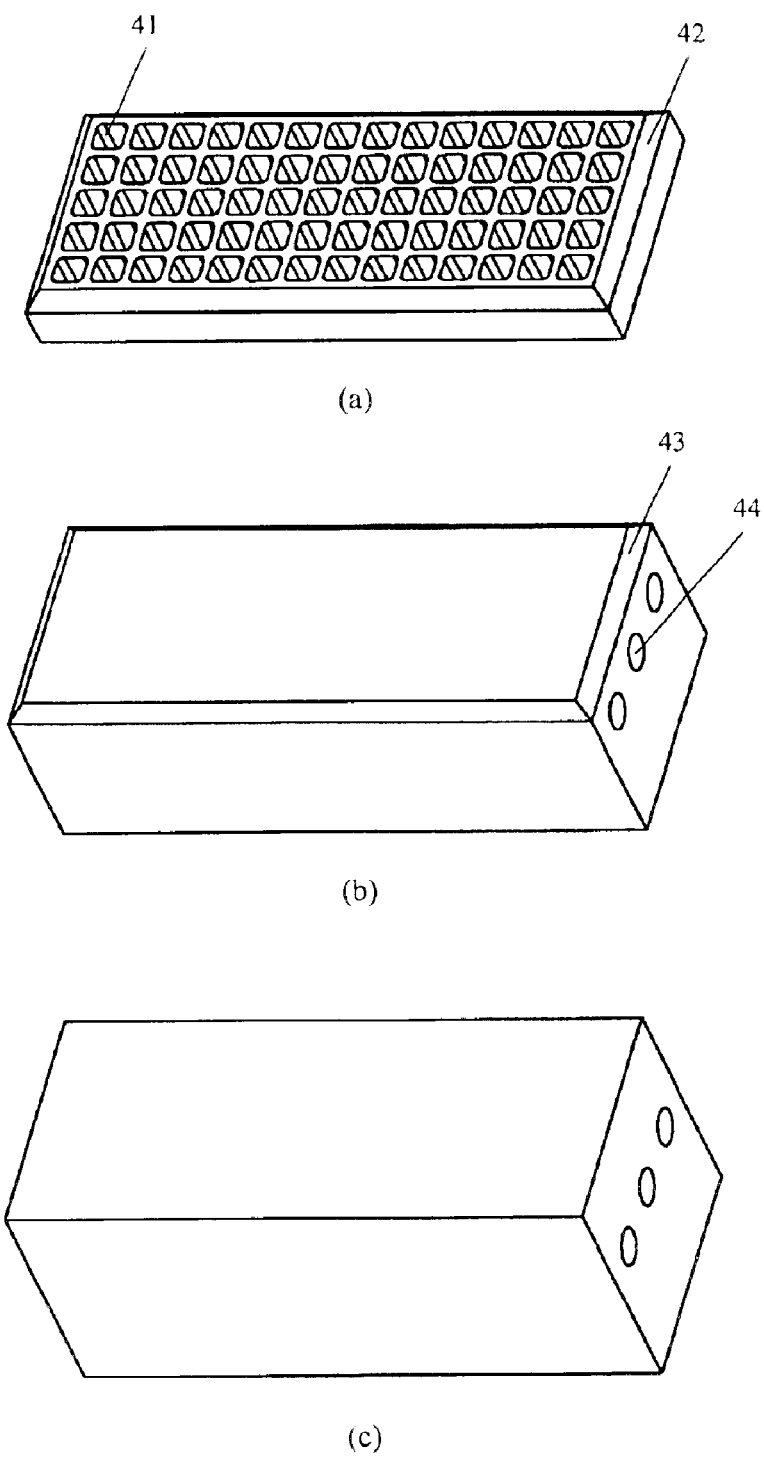
FIG. 3 shows one embodiment for the mold inserts 27 and 28 using air pockets as thermal insulation.

Particularly for the mold inserts 27 and 28, there are many possible embodiments. FIG. 3 shows one specific embodiment using air pockets as insulation. FIG. 3.a is a metallic piece with open air pockets 41 on one side. The to-be-heated surface is on the other side. FIG. 3.b is another metallic piece with cooling channels 44 inside it. The two pieces shown in FIG. 3.a and FIG. 3.b are welded together at the angled edges 42 and 43 and then ground at the weld to form a mold insert as shown in FIG. 3.c. The design of the air pockets is crucial to the performance of the insert. First, the air pockets should provide sufficient thermal insulation during heating, and yet allow enough cooling through ribs between pockets during the cooling stage. Second, the design of the air pockets should ensure strength of the insert during molding. One example of design parameters for a 25 mm×50 mm insert using 400 series stainless steel is: 3 mm×3 mm×3 mm air pockets, about 1 mm away from the insert surface, with 1 mm thick ribs in-between. Such air pockets provide good insulation during the heating stage while facilitating good cooling as well during the cooling stage. According to simple beam calculation, for the design with the above parameters the deformation during injection molding due to the air pockets can be neglected.

Figure 4:
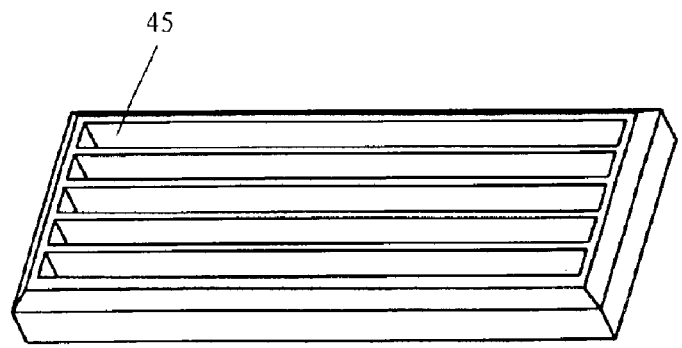
FIG. 4 shows another embodiment for the mold inserts 27 and 28 using on-off cooling channels just beneath the heating surface.
Figure 4:
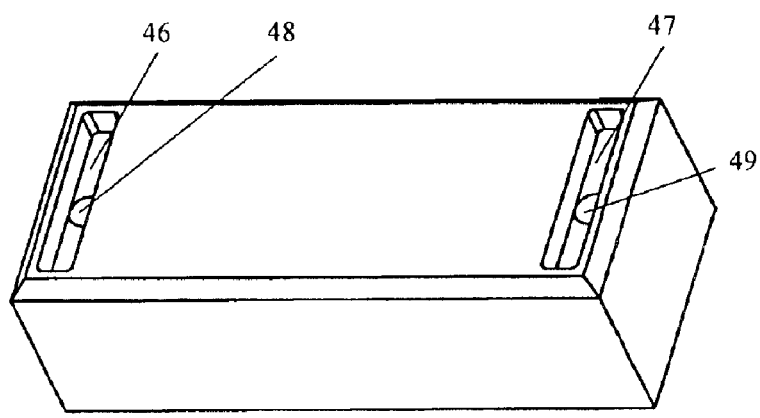
Figure 4:
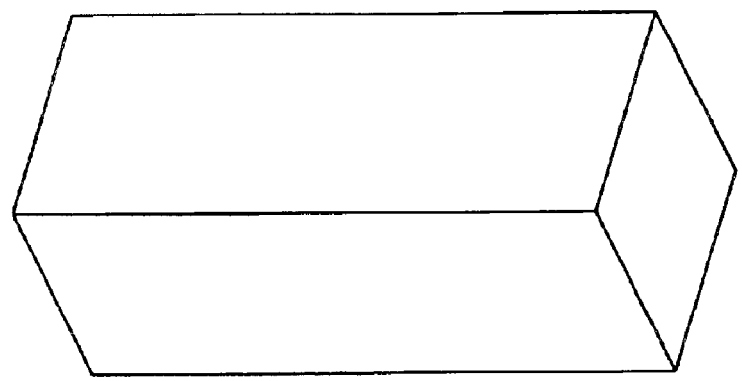

FIG. 4 shows another alternative embodiment of the mold inserts 27 and 28. FIG. 4.a is a metallic piece with channels 45 on one side. FIG. 4.b is another metallic piece with two channels 46 and 47 and coolant entry and exit 48 and 49. The two metallic pieces are welded together at the angled edges and then ground at the weld to form a mold insert as shown in FIG. 4.c. During the heating stage, the channels 45 are filled with air or vacuumed so that good thermal insulation can be provided. During the cooling stage, coolant such as water is switched on so that rapid cooling is achieved by flowing coolant just beneath the heating surface.

For the embodiments shown in FIG. 3 and FIG. 4 to be efficiently applicable to general contour and shape of mold inserts, conformal design of the pockets and channels is preferred. Two manufacturing methods for fabricating such conformal pockets and channels are rapid tooling, such as selective laser sintering and vacuum brazing of the layered mold pieces.

EXAMPLE 1

Figure 5:
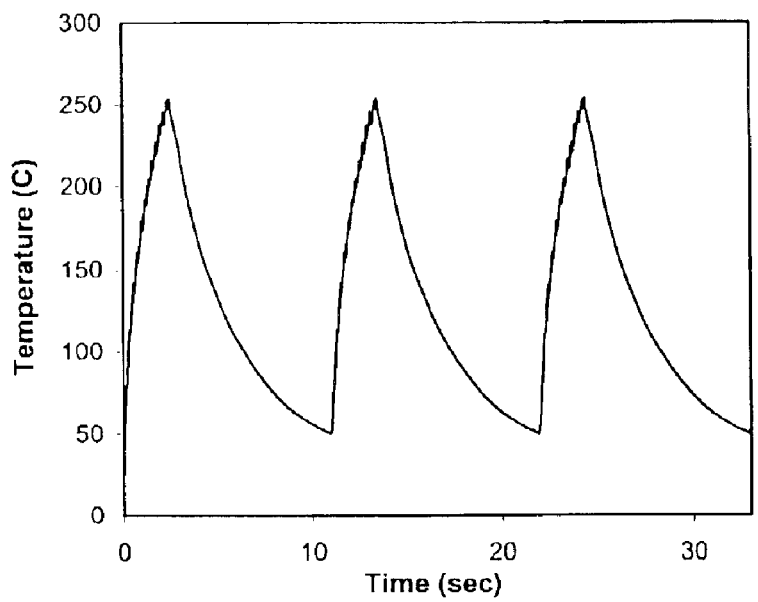
FIG. 5 shows typical surface temperature response of mold inserts using proximity heating.

Two mold inserts developed for proximity heating were constructed first. Conformable cooling channels are embedded in the two inserts. The two inserts were placed on a flat insulation top, facing each other with a gap about 1 mm in-between. High frequency (~650 KHz) current is applied to the electric loop formed by the two mold inserts facing each other. Due to the proximity effect, most current flows at the inner surfaces of the two inserts, thus rapidly heating the surface of the formed gap. The power applied is around 2.5 KW. Once designated temperature is reached, the power is turned off and the insert surface starts to cool down. A typical surface temperature response of the mold insert is shown in FIG. 5. The insert surface can be rapidly heated from room temperature to 250° C. in two seconds and then rapidly cooled to 50° C. in less than 10 seconds.

EXAMPLE 2

Heat transfer simulation results are presented in this example to illustrate the advantage of using the rapid heating and cooling mold insert as described in Example 1 to reduce injection molding cycle time. The molding process using the rapid heating and cooling mold insert is termed Rapid Thermal Response (RTR) molding in the description. Polycarbonate samples with varied thickness, 0.5 mm, 1 mm, 2 mm and 4 mm are considered in the simulation. The experimental cavity surface temperature as shown in FIG. 5 is used as the temperature boundary for the part. For comparison, the case of conventional injection molding was also simulated. The processing parameters for both cases are listed in the following:

| Processing Parameters | Conventional Molding | RTR Molding |
|---|---|---|
| Melt temperature, ° C. | 320 | 320 |
| Mold temperature, ° C. | 110 | 25 |
| Ejection Temperature, ° C. | 130 | 130 |

Figure 6:
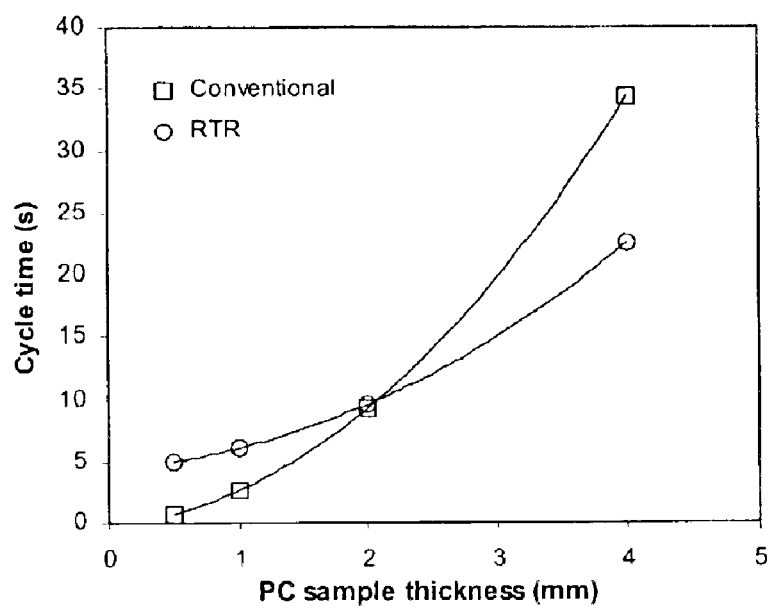
FIG. 6 shows the comparison of cycle time between conventional molding and molding using rapidly heated mold inserts of the current invention.

The cycle time comparison between the two processes is shown in FIG. 6. For the two thin samples, the 0.5 mm thick one and the 1.0 mm thick one, the cycle time in RTR molding is longer than that in conventional molding. As part thickness increases, the two cycle times reach the same at a part thickness of 2 mm. After that, RTR molding wins the competition by a more than 30% cycle time reduction for the 4 mm thick sample. This phenomenon can be explained in the following. As we know, the RTR cycle time has two parts, the heating and soaking time and the cooling time, while the conventional one only has the cooling time. With very thin parts, the first part dominates in RTR molding, thus resulting in longer cycle time than the conventional one. As parts getting thicker and thicker, the second part becomes large enough to take over dominance. Because a much colder mold base is used in RTR molding, the second part is smaller than the conventional cooling time. As a result, the RTR molding process has a shorter cycle time than the conventional molding process when thick parts are molded. This is mostly the case when optical lenses are molded, which have a typical thickness more than 2 mm.

EXAMPLE 3

Figure 7:
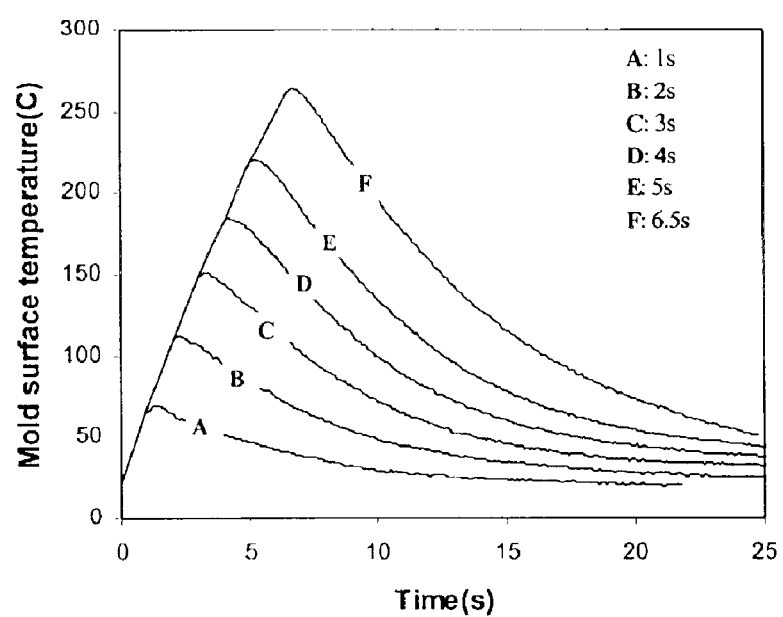
FIG. 7 shows heating and cooling response at the surface of a testing mold cavity using the invention.

A set of mold inserts designed for proximity heating were made first. Closure of the two inserts forms a rectangle mold cavity, 72 mm long and 25 mm wide, with the thickness adjustable. Polycarbonate was chosen as molding material. The so constructed mold has a capability of raising surface temperature from 25° C. to above 200° C. within 5 seconds and cooling to a temperature blow the polycarbonate ejection temperature in less than 15 seconds, as shown in FIG. 7. No cooling channels were made in the two inserts. The cooling rate can be further increased by embedded cooling channels directly inside the two inserts as illustrated in FIG. 3 and FIG. 4 and shown in Example 1. The maximum power of the high-frequency power supply used in the experiment is less than 3 KW. The heating rate can be further increased by using a power supply with higher power output.

Figure 8:
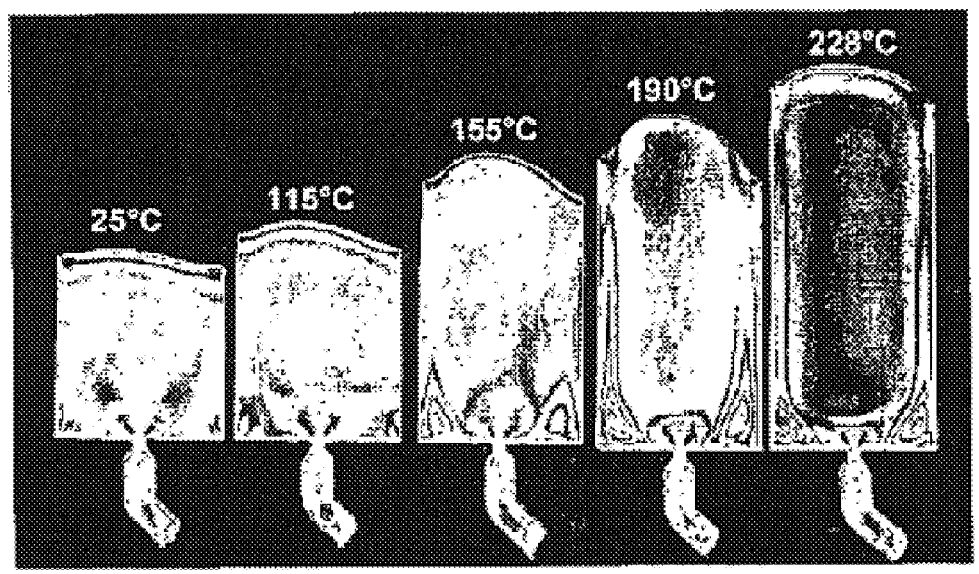
FIG. 8 shows reduction in birefringence in injection molded parts by using the invention.
Figure 9:
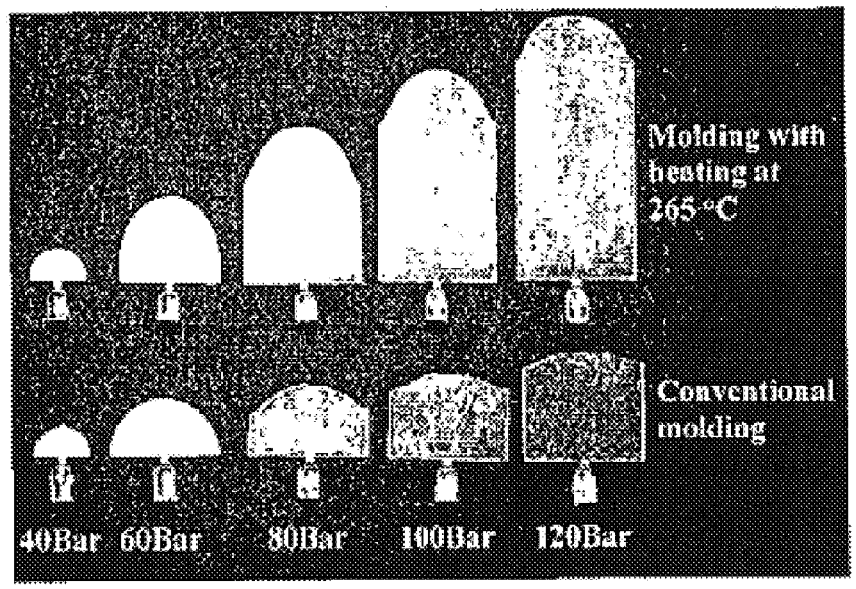
FIG. 9 shows increase in flow length for thin-wall injected molded parts by using the invention.

The injection molding experiments were carried out on a 30-ton BOY® injection molding machine. FIG. 8 shows the effect of heating on the birefringence of molded 1-mm thick polycarbonate parts. The birefringence level decreased as the heating temperature approached and exceeded the glass transition temperature until it almost disappeared at a heating temperature of 190° C. FIG. 9 shows a comparison of flow length versus injection pressure with and without heating for 0.5-mm thick polycarbonate parts under same processing conditions. The heated mold created an isothermal molding condition during the filling stage, where the mold surface temperature and the incoming melt had the same temperature. The melt in the heated mold cavity flowed three times longer than that in the conventional mold cavity.

EXAMPLE 4

Figure 10:
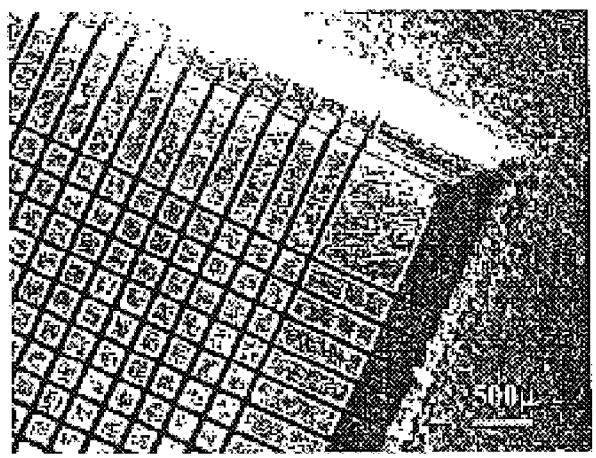
FIG. 10 shows testing microstructures on a set of mold inserts designed for proximity heating using the invention.
Figure 11:
FIG. 11 shows comparison of microstructure replication between conventionally injection molded parts and parts molded using the invention.
Figure 11:

A set of mold inserts designed for proximity heating were made first. Microstructures were then made on one of the two mold inserts using precision engineering methods. The microstructure is located on a landing area of 6 mm×6 mm in the middle of the insert and forms 25×25 cross micro slots, as shown in FIG. 10. Replication of these cross slots results in 576 micro wells, 225 $\mu$m×225 $\mu$m, and 400 $\mu$m deep. The rib separating two adjacent wells is 40 $\mu$m thick. High density polyethylene was chosen for the molding experiment. Complete replication of the 400-$\mu$m deep and 40-$\mu$m thick (aspect ratio is 10) microstructures was achieved using the invention with a 2-s heating duration and total cycle time of 15 seconds. FIG. 11 shows micrographs of fractured samples both conventionally molded and molded using the invention. The replication using conventional molding is less than 5% of the to-be-replicated length while complete replication was achieved using the invention.

CONCLUSION, RAMIFICATIONS, AND SCOPE

The invention discloses a method of rapidly heating a mold cavity to a predetermined temperature preferably above the softening or melting temperature of the molding material prior to and/or during the molding stage thereby increasing moldability and improving quality of molded parts. The mold cavity is formed by two metallic halves on which high-frequency electric current is applied and an electric circuit involving the two halves is formed. Due to the proximity effect, the electrical current flows on the inner surfaces of the two cavity halves, thus rapidly heating the mold cavity. Proper use of insulation behind the cavity surface helps increase heating efficiency. Conformal on-off cooling channels provide both thermal insulation during the heating phase and rapidly cooling of the molded article during the cooling phase. Possible benefits of molded parts using the rapidly heatable and coolable mold cavity disclosed in this patent is far-reaching, such as better feature replication, less birefringence, less residual stress, stronger weld lines, better surface quality, increased crystallinity, reduced total cycle time, etc.

While the above description contains many specificities these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed is:

1. A method for heating at least a portion of mold surface comprising the steps of:

passing an alternating electric current through at least a portion of first mold half and then into at least a portion of second mold half and out of the second mold half, wherein said mold halves face each other with a gap between said mold halves during heating stage, resulting in a proximity effect, wherein the majority of the electric current flows at the inner surfaces of said gap to rapidly heat the surface of the mold cavity formed by said mold halves.

2. The method of claim 1 wherein the frequency of the alternating electric current is between about 50 Hz and about 1 Mhz.

3. The method of claim 1 wherein the frequency of the alternating electric current is between about 1 MHz and about 500 MHz.

4. The method of claim 1 wherein the thickness of said gap between said two facing halves is from about 0.01 mm to about 10 cm.

5. The method of claim 1 wherein thermal insulation is embedded beneath and adjacent to at least a portion of the surface of said mold cavity thereby faster heating is accomplished than without employment of said thermal insulation.

6. The method of claim 5 wherein said thermal insulation comprises a combination of pockets.

7. The method of claim 6 wherein said pockets are gas pockets.

8. The method of claim 7 wherein said gas pockets are air pockets.

9. The method of claim 1 wherein said heating is followed by cooling at least a portion of the mold comprising said mold halves by:

passing a cooling fluid to at least a portion of said mold.

10. The method of claim 9 wherein said cooling fluid is selected from a group that consists of air, cooled air and liquid nitrogen.

11. A method for heating at least a portion of mold surface comprising the steps of:

passing an alternating electric current through at least a portion of a mold half thereby resulting in a skin effect wherein the majority of the current flows at the surface of said mold half to rapidly heat the surface.

12. The method of claim 11 wherein the frequency of the alternating electric current is between about 50 Hz to about 1 MHz.

13. The method of claim 11 wherein the frequency of the alternating electric current is between about 1 MHz and about 500 MHz.

14. The method of claim 11 wherein thermal insulation is embedded beneath and adjacent to at least a portion of the surface of said mold cavity thereby faster heating is accomplished than without employment of said thermal insulation.

15. The method of claim 14 wherein said thermal insulation comprises a combination of pockets.

16. The method of claim 15 wherein said pockets are gas pockets.

17. The method of claim 16 wherein said gas pockets are air pockets.

18. The method of claim 11 wherein said heating is followed by cooling at least a portion of the mold comprising said mold halves by:

passing a cooling fluid to at least a portion of said mold.

19. The method of claim 18 wherein said cooling fluid is selected from air, cooled air and liquid nitrogen.

* * * * *